US006260473B1

(12) United States Patent
Barth et al.

(10) Patent No.: US 6,260,473 B1
(45) Date of Patent: Jul. 17, 2001

(54) CLAMPING DEVICE FOR A PISTON TO BE MOUNTED

(75) Inventors: Alois Barth, Stuttgart; Reinhold Fuchs, Fellbach; Dieter Messmer, Stuttgart, all of (DE)

(73) Assignee: Mahle GmbH, Stuttgart (DE)

( * ) Notice: Subject to any disclaimer, the term of this patent is extended or adjusted under 35 U.S.C. 154(b) by 0 days.

(21) Appl. No.: 09/423,915

(22) PCT Filed: Mar. 6, 1998

(86) PCT No.: PCT/DE98/00675

§ 371 Date: Nov. 11, 1999

§ 102(e) Date: Nov. 11, 1999

(87) PCT Pub. No.: WO98/53193

PCT Pub. Date: Nov. 26, 1998

(30) Foreign Application Priority Data

May 20, 1997 (DE) ............................................. 197 21 013

(51) Int. Cl.⁷ ....................................................... F16J 1/04
(52) U.S. Cl. ................................................................. 92/220
(58) Field of Search ....................................... 92/220, 255

(56) References Cited

U.S. PATENT DOCUMENTS

| 1,293,846 | * | 2/1919 | Marmon | ................................ 92/220 |
| 1,331,573 | * | 3/1920 | McKechnie et al. | ............... 92/220 X |
| 1,377,438 | * | 5/1921 | Ricardo | ................................... 92/220 |
| 2,104,347 | * | 1/1938 | Larkin | ................................. 92/220 X |
| 2,464,554 | * | 3/1949 | Bushby | .............................. 92/220 X |
| 3,323,503 | * | 6/1967 | Grosshans et al. | ................. 92/220 X |
| 4,084,553 | * | 4/1978 | Forde et al. | ........................ 92/220 X |

FOREIGN PATENT DOCUMENTS

| 34 26 238 | 1/1986 | (DE) . |
| 35 27 812 | 2/1987 | (DE) . |
| 44 16 120 | 11/1995 | (DE) . |
| 0 237 853 | 9/1987 | (EP) . |
| 384458 | * 12/1932 | (GB) ....................................... 92/220 |
| 1 099 296 | 1/1968 | (GB) . |

* cited by examiner

*Primary Examiner*—John E. Ryznic
(74) *Attorney, Agent, or Firm*—Collard & Roe, P.C.

(57) ABSTRACT

Disclosed is a clamping device for a piston to be mounted, said clamping device being actuated mainly in the direction of pressure/counter-pressure, whereby the whole initial pressure is increased, resulting in greater anti-loosening safety. To that end two screws are placed very close to each other on each side of the piston, one pair being on the pressure side of the piston and the other pair on the counter-pressure side. Both screw pairs have on each side a common pressure member.

3 Claims, 1 Drawing Sheet

CLAMPING DEVICE FOR A PISTON TO BE MOUNTED

The invention relates to a piston to be mounted, as defined in the introductory part of claim 1. Such a piston is known from DE-OS 34 26 238.

Figure 2:
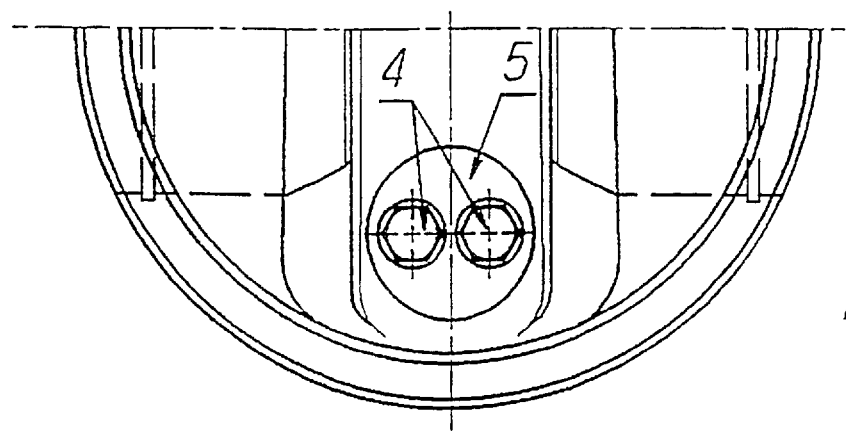

FIG. 2 of the present patent document shows that the two connecting screws are arranged in the thrust/counter thrust direction. This type of construction is successfully employed in connection with certain highly stressed diesel engines such as, for example engines for locomotives or yachts.

However, the drawback of two-screw pistons lies in the fact that as compared to multi-screw pistons, stiffer screws have to be used, while the initial preclamping force is nonetheless lower.

Therefore, the invention is dealing with the problem of increasing in connection with a piston with a screw arrangement the total initial thrust force substantially in the thrust/counter thrust direction, thereby permitting the use of screws with higher elasticity.

The invention provides a piston with a thrust side and a counter thrust side. The piston comprises a top component and a bottom component joined together by two sets of screws. One set of screws is located on the thrust side and the second set of screws is located on the counter-thrust side. Further provided is a common pressure member connected to each set of screws.

By using two screws each on the pressure side and on the counter pressure side, said screws being arranged closely to each other in pairs, a higher initial pressure force is achieved and thus greater safety against mass force. The minimum spacing between the center axes of a screw arranged on the pressure side, and a screw arranged on the counter pressure side amounts in this connection to 50% of the diameter of the piston.

Furthermore, higher safety against loosening is obtained because screws with higher elasticity can be used.

The pressure members have a distinctly simpler structure than the pressure elements customarily employed. For example, the pressure members can be designed in the form of simple round plates with two bores, such plates abutting plane support surfaces of the interior of the piston.

Figure 1:
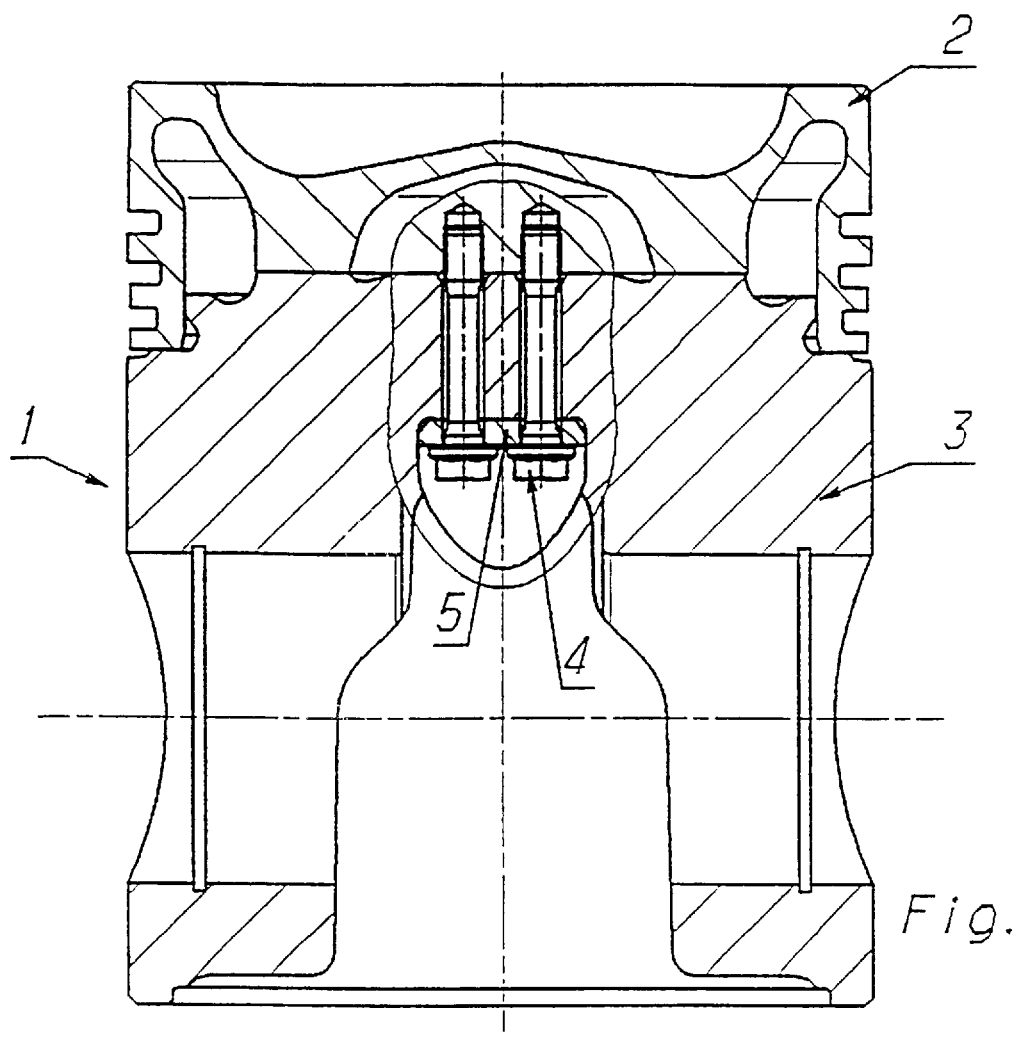

The invention is described in the following with the help of an exemplified embodiment shown in the drawing, in which FIG. 1 shows the cross section of a piston as defined by the invention; and FIG. 2 shows a bottom view of a piston as defined by the invention.

The piston 1 to be mounted consists of a top component 2 made of steel, and a bottom component 3 made of an aluminum alloy, said components being joined with each other by a total of four screws 4, which are arranged in pairs and extend parallel with the axis of the piston. The screw connections are substantially arranged in the thrust/counter thrust direction. Each pair of screws has a common pressure member 5.

FIG. 2 shows the arrangement of the screws in the pressure/counter pressure direction.

What is claimed is:

1. A piston having a thrust side and a counter thrust side, comprising:
    a top component (2);
    a bottom component (3) having a wrist pin bore extending therethrough;
    two sets of screws (4) extending parallel to the axis of the piston for joining the two components and arranged closely to each other, wherein one set of screws is located on the thrust side and the second set of screws is located on the counter-thrust side and the minimum distance between the center axis of a screw on the trust side and a screw on the counter thrust side is 50% of the diameter of the piston; and
    a common pressure member (5) connected to each set of screws.

2. The piston (1) according to claim 1, wherein the axes of the two sets of screws (4) form a rectangular shape, having two large sides and two small sides and the ratio of the large side length to the small side length is greater than 4:1.

3. The piston (1) according to claim 1, wherein the spacing between the axes of the two sets of screws (4) is smaller than three times the diameter of the screw thread.

* * * * *